(12) United States Patent
Tennent et al.

(10) Patent No.: US 11,574,283 B2
(45) Date of Patent: Feb. 7, 2023

(54) UPDATING ASSET OWNERSHIP SYSTEMS AND METHODS

(71) Applicant: Caterpillar Inc., Peoria, IL (US)

(72) Inventors: Toby Tennent, Chicago, IL (US); Eric J. Philips, Washington, IL (US); Brandon Hootman, Canton, IL (US); Anatoly Belkin, Glenview, IL (US); Daniela Radakovic, Chicago, IL (US)

(73) Assignee: Caterpillar Inc., Peoria, IL (US)

(*) Notice: Subject to any disclaimer, the term of this patent is extended or adjusted under 35 U.S.C. 154(b) by 108 days.

(21) Appl. No.: 17/123,013

(22) Filed: Dec. 15, 2020

(65) Prior Publication Data

US 2022/0188746 A1 Jun. 16, 2022

(51) Int. Cl.
*G06Q 10/08* (2012.01)
*G06F 16/9038* (2019.01)
*G07C 5/00* (2006.01)
*H04W 4/38* (2018.01)

(52) U.S. Cl.
CPC ....... *G06Q 10/087* (2013.01); *G06F 16/9038* (2019.01); *G07C 5/008* (2013.01); *H04W 4/38* (2018.02)

(58) Field of Classification Search
CPC .......... G06K 19/0723; G06Q 10/087
See application file for complete search history.

(56) References Cited

U.S. PATENT DOCUMENTS

| 9,256,881 | B2 | 2/2016 | Engels et al. |
| 10,351,100 | B1* | 7/2019 | Hentschel ............ B60R 25/243 |
| 2012/0221443 | A1 | 8/2012 | Macmillan |
| 2019/0007414 | A1* | 1/2019 | Trim .................... G06Q 10/087 |
| 2019/0197798 | A1 | 6/2019 | Abari |
| 2020/0272758 | A1 | 8/2020 | Gardner et al. |

FOREIGN PATENT DOCUMENTS

CN 108985916 A 12/2018

* cited by examiner

*Primary Examiner* — A. Hunter Wilder
(74) *Attorney, Agent, or Firm* — Xsensus LLC

(57) ABSTRACT

The present disclosure is directed to systems and methods for updating asset ownership for telematics-enabled machinery. In some embodiments, the updating asset ownership system comprises asset entities that transmit telemetry data. A communication interface of the updating asset ownership system can receive the telemetry data. An asset ownership data store of the updating asset ownership system can be configured to store asset owner data that identify designated owners associated with the asset entities. An asset ownership comparator of the updating asset ownership system can process the received telemetry data. Based on the processing, the asset ownership comparator can update designated owners of asset entities stored in the asset ownership data store.

10 Claims, 5 Drawing Sheets

UPDATING ASSET OWNERSHIP SYSTEMS AND METHODS

TECHNICAL FIELD

The present disclosure relates to a system and method for updating asset ownership for telematics-enabled machinery.

BACKGROUND

Platforms that store data related to assets and their ownership often suffer from a lack of good quality data and the ability to evaluate the data for potential errors. The data often lacks completeness, conformity, consistency, accuracy, and integrity. As a result, one crucial data issue that has a major impact is missing or incorrect asset owner information. Some assets may be in use for decades and change hands a number of times, resulting in data records of asset resale being frequently missing, inaccurate, or unverified. Conventional tools or processes that store data related to assets and their ownership often fail to address these issues, and thus there is no definitive information on the asset ownership over the asset lifecycle. Furthermore, existing systems and methods lack ways to process and evaluate existing and incoming data from the assets themselves for determining asset ownership. The result is dubious ownership information being presented that can easily lead to expectations of showing correct asset ownership to not be met. Customers, dealers, and/or any entities who desire access to reliable and robust data related to assets and their ownership suffer from a poor experience, resulting in erosion of confidence in the underlying applications and data.

For example, Chinese Patent Application No. CN108985916A to Liu, (hereinafter "Liu") describes a vehicle digital asset management method and server. In particular, Liu discloses receiving vehicle digital asset registration requests, evaluating the vehicle's asset value, sending the asset value to a user for confirmation, and registering the vehicle when the confirmation is received. As a result, the ability to identify potentially problematic asset ownership information/data and to update such information/data is lacking from the methods described by Liu.

There is a need for systems and methods that can identify potentially problematic asset ownership data, evaluate that data, and perform reliable updates of asset ownership to correct for inaccuracies and missing information, all in an automated fashion. There is also a need for processes that can receive data from the assets themselves, such as enterprise and telemetry data, and use it in evaluating potentially inaccurate or missing asset ownership data. Many current system and methods lack the ability to perform updates of asset ownership using a single automated system storing vast amount of data. These systems and methods further lack the ability to incorporate feedback as to the accuracy of the updates performed. Additionally, there is a need for ways to perform such updates of asset ownership in a safe and secure way without privacy violations (e.g., displaying asset information that can be personal).

It is with respect to these and other general considerations that the aspects disclosed herein have been made. Also, although relatively specific problems may be discussed, it should be understood that the examples should not be limited to solving the specific problems identified in the background or elsewhere in the disclosure.

SUMMARY

According to a first aspect, a system can include asset entities, which can comprise telematics-enabled machinery, that transmit telemetry data. The system can include a communication interface that receives the telemetry data from the asset entities. The system can also include an asset ownership data store that stores asset owner data associated with the asset entities, and the asset owner data identifies as a designated owner at least a first owner entity associated with at least one of the asset entities. The system can further include an asset ownership comparator that processes the telemetry data, identifies a second owner entity that is associated with the at least one of the asset entities, evaluates whether the second owner entity is more likely than the first owner entity to be the designated owner of the at least one of the asset entity, and assigns the second owner entity to be the designated owner when it is more likely than the first owner entity to be the designated owner.

According to a further aspect, a method can include receiving telemetry data from asset entities. The method can include storing asset owner data associated with the asset entities, and the asset owner data identifies as a designated owner at least a first owner entity associated with at least one of the asset entities. The method can also include processing one or more of the received telemetry data, and based on the processing, identifying a second owner entity that is associated with the at least one of the asset entities. The method can further include evaluating whether the second owner entity is more likely than the first owner entity to be the designated owner of the at least one of the asset entities, and when it is more likely, assigning the second owner entity to be the designated owner.

According to another aspect, a computer-readable media storying non-transitory computer executable instructions that when executed cause a computing system to perform a method. The method can include receiving telemetry data from asset entities, and the telemetry data can comprise location information of the asset entities. The method can also include storing asset owner data associated with the asset entities, and the asset owner data identifies as a designated owner at least a first owner entity associated with at least one of the asset entities. The method can also include identifying nearby asset entities in proximity to the at least one of the asset entities, determining likely owner entities that each own at least one of the nearby entities, and identifying from the likely owner entities a second owner entity that is associated with the at least one of the asset entities. The method can further include evaluating whether the second owner entity is more likely than the first owner entity to be the designated owner of the at least one or the asset entities, and when it is more likely, assigning the second owner entity to be the designated owner.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Figure 1:
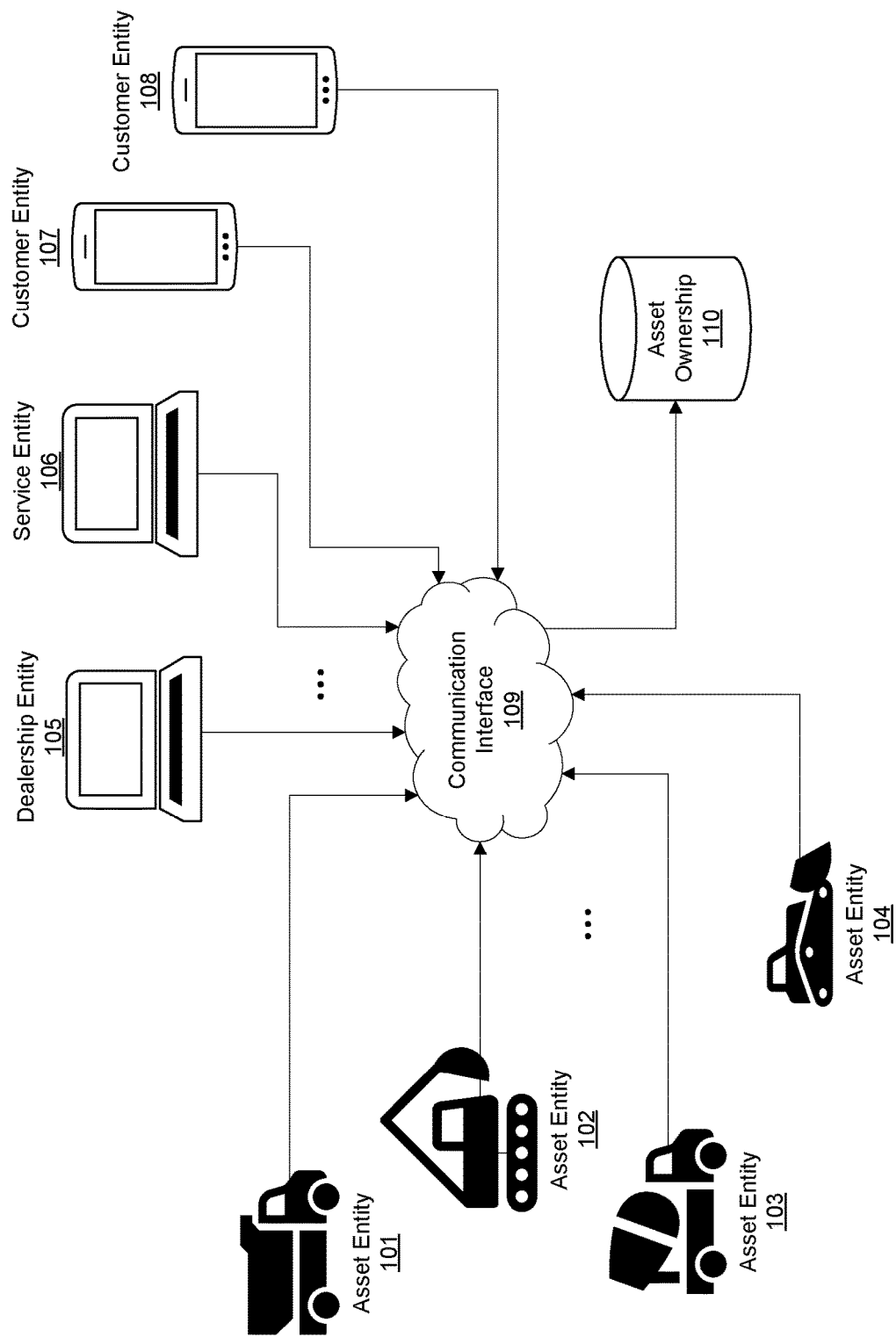
FIG. 1 is a block diagram illustrating components of the updating asset ownership system for receiving and storing data associated with asset entities.

FIG. 1 is a block diagram illustrating components of the updating asset ownership system for receiving and storing data associated with asset entities. Asset entities 101, 102, 103, and 104 of the updating asset ownership system can be any telematics-enabled machinery, vehicle, equipment, or device. For example, asset entity 101 can be a dump truck, asset entity 102 can be an excavator, asset 103 can be a cement truck, and asset 104 can be a bulldozer. Other asset entities of the updating asset ownership system can include, but are not limited to trucks, asphalt pavers, backhoe loaders, cold planers, compactors, dozers, draglines, drills, rope shovels, mining shovels, material handlers, motor graders, pipelayers, road reclaimers, track loaders, telehandlers, track loaders, mining trucks, conveyers, utility vehicles, wheel loaders, tractors, or scrapers. Each of the telematics-enabled machinery is configured to collect and transmit telemetry data, which can be data transmitted wirelessly or wired to receiving entities for monitoring, storing, or evaluating. Types of telemetry data can include, but are not limited to, location information, sensory data, asset condition, performance data, oil levels, battery levels, temperature, time of use, proximity data, service meter units, vehicle data, engine data, service/maintenance reports, operation errors, normative behavior, nonnormative behavior, or fault codes, all associated with the telematics-enabled machinery. For example, the cement truck 103 can use GPS sensors in its system to determine its current geographic location and its proximity relative to other asset entities such as dump truck 101, excavator 102, and bulldozer 104. The cement truck can further identify asset entities within a predefined threshold distance, determine if they are of the same fleet, and transmit that location information as telemetry data.

In some embodiments, the asset entity transmits telemetry data when the asset undergoes a change. For example, a machine, vehicle, equipment, or device can detect a change in oil level, temperature, engine performance, or battery level using its sensors and transmit that as telemetry data. As another example, a machine, vehicle, equipment, or device can be prompted to transmit data regarding warning error flashes during the operation of a vehicle that can indicate nonnormative behavior (e.g., collision, operation error, off-roading, irregular oil levels, irregular performance levels, unstable engine) as observed by sensors. In other embodiments, the asset entity transmits telemetry data on a scheduled or regular basis. The schedule can be monthly, yearly, daily, hourly, by the minute, every second, or any regular time interval. For example, the excavator 102 can transmit telemetry data regarding how much dirt it has shoveled every hour, the bulldozer 104 can transmit telemetry data regarding how much distance it has traveled every month, the dump truck 101 can transmit telemetry data regarding the weight of dumps it has carried every year, and the cement truck 103 can transmit telemetry data regarding the amount of cement it can mix per minute.

The telemetry data that is transmitted can inform about the degree of activity of an asset entity. An asset entity transmitting telemetry data of high degree of change in oil levels and battery levels can indicate the asset entity is engaged in a high-performance activity. An asset entity transmitting telemetry data indicating a constant fuel level or energy capacity can indicate the asset entity has been dormant. The first time an asset entity transmitted telemetry data regarding time of use can indicate the age of the asset entity. An asset entity transmitting telemetry data regarding steady levels of performance and few warning errors can indicate the asset entity is being regularly serviced and maintained. The telemetry data that is transmitted can also inform about the relations of activities between asset entities. For example, asset entities 101, 102, 103, and 104 can all be transmitting telemetry data of similar times of use, indicating they are likely working together at similar schedules and thus likely operating a similar construction project. As another example, asset entities 101, 102, 103, and 104 can transmit telemetry data with similar oil level, engine, performance, and battery level changes, indicating a similar degree of activity and thus likely engaged in a similar activity. As another example, the excavator 102 can transmit telemetry data regarding how much dirt it has shoveled, which can be similar to the amount of dirt being transported by the dump truck 101 as indicated in the telemetry data transmitted by the dump truck. This can indicate the excavator 102 and dump truck 101 are working on the same activity as well. All of the above instances and embodiments of telemetry data described above can be used further by ensemble of models 300, which is described more in detail in FIG. 3.

Dealership entity 105, service entity 106, customer entity 107, and customer entity 108 of the updating asset ownership system can each be any computing device configured to transmit asset information data. The asset information data is associated with asset entities (e.g., asset entity 101, 102, 103, 104), and includes information data regarding such asset entities. Types of asset information data can include, but are not limited to, asset model/type information, asset age, dealership history and information, sales history and information, auction history and information, usage information, contact information, rent history and information, lease history and information, buyer history and information, customer information, service history and information, manually entered ownership information, asset inspection information, inventory information, miscellaneous information, work order history, fleet information, or invoices for work done.

In some embodiments, dealership entity 105 is a computing device that allows dealer entities to input and transmit asset information data related to dealership transactions. For example, the dealership entity 105 present a graphical user interface to a dealer to enter any deal, sale, lease, rent, or auction information of an asset entity (e.g., sales price, sales date, lease price, lease date, rent price, rent date, sales parties, rental parties, leasing parties, owning parties, seller identification, location of transaction, etc.). In some embodiments, service entity 106 is a computing device that allows service entities to transmit asset information data related to the maintenance of an asset entity. For example, the service entity 106 can present a graphical user interface to a maintenance provider to enter any service information work order invoices related to an asset entity (e.g., engine fix, device maintenance, equipment maintenance, machine repair, parties involved during the repair, owner entity of asset entity at the time of maintenance, location of maintenance, etc.). In some embodiments, customer entity 106 is a mobile computing device that allows customer entities to transmit asset information data related to the purchase of an asset entity and subsequent transactions of the asset entity to other parties. For example, the customer entity 107 can present a graphical user interface to a customer or buyer to enter customer information and subsequent transaction information related to an asset entity (e.g., customer identification, subsequent sales price, subsequent sales date, subsequent lease date, subsequent lease price, etc.).

In some embodiments, the sales, rent, or lease history of an asset entity can be pieced together by the updating asset ownership system by examining the parties involved in the transaction of the asset entity. For example, a dealership entity 105 can transmit sales information regarding only the initial sales of an asset entity to customer entity 107, while a customer entity 107 can transmit sales information regarding the subsequent sales of the asset entity to a customer entity 108. In this scenario, the sales history of the asset entity includes a dealership entity that initially sold the asset entity to a first customer entity, the first customer entity that purchased the asset entity from the dealership entity, and a second customer entity that subsequently purchased the asset entity from the first customer entity and is now the owner. The second customer entity can also subsequently sell, rent, or lease the asset entity to another party. In some embodiments, dealership entity 105 regularly receives updates regarding transactions of an asset entity and has a complete history of data records related to the sales, lease, or rent of the asset entity. Thus, the dealership entity 105 can transmit asset information data regarding the entire sales, rental, or lease history of an asset entity.

In some embodiments, the customer entity 107 or 108 can transmit fleet information data, a type of asset information data. The fleet information can include data related to the fleet of asset entities a customer entity owns, such as the fleet asset numbers (e.g., by type), fleet asset values (e.g., price of each), fleet asset ages, fleet asset usages (e.g., service meter hours), or industries the customer entity is involved in. For example, customer entity 107 can transmit fleet information data that includes fleet asset numbers, values, age, and usages for the asset entities 101, 102, 103, and 104 that the customer entity 107 owns. As another example, customer entity 108 can transmit fleet information regarding involvement in the cement industry and ownership of a fleet of several cement trucks such as 103. All of the above instances and embodiments of asset information data described above can be used further by ensemble of models 300, which is described more in detail in FIG. 3.

Communication interface 109 of the updating asset ownership system is configured to receive telemetry data from asset entities and/or asset information data from dealership entities, service entities, or customer entities. In some embodiments, communication interface 109 can receive telemetry data from asset entities 101, 102, 103, 104, and/or asset information data from dealership entity 105, service entity 106, customer entity 107, and customer entity 108. Communication interface 109 can receive the telemetry data and asset information data wirelessly, wired, over a cloud, or any communication network. Furthermore, communication interface 109 can be configured to receive the telemetry data and asset information data in parallel or sequentially. Once telemetry data or asset information data is received, communication interface 109 is configured to store the telemetry data or asset information data in an asset ownership data store 110 of the updating asset ownership system. In some embodiments, communication interface 109 filters the telemetry data and/or asset information data by only storing telemetry data and/or asset information associated with asset entities that have entries in the asset ownership data store. For example, telemetry data and/or asset information data received from an asset entity that currently exists in the asset ownership data store is stored, while telemetry data and/or asset information data received from an asset entity that does not have an entry in the asset ownership data store is filtered out.

Figure 2:
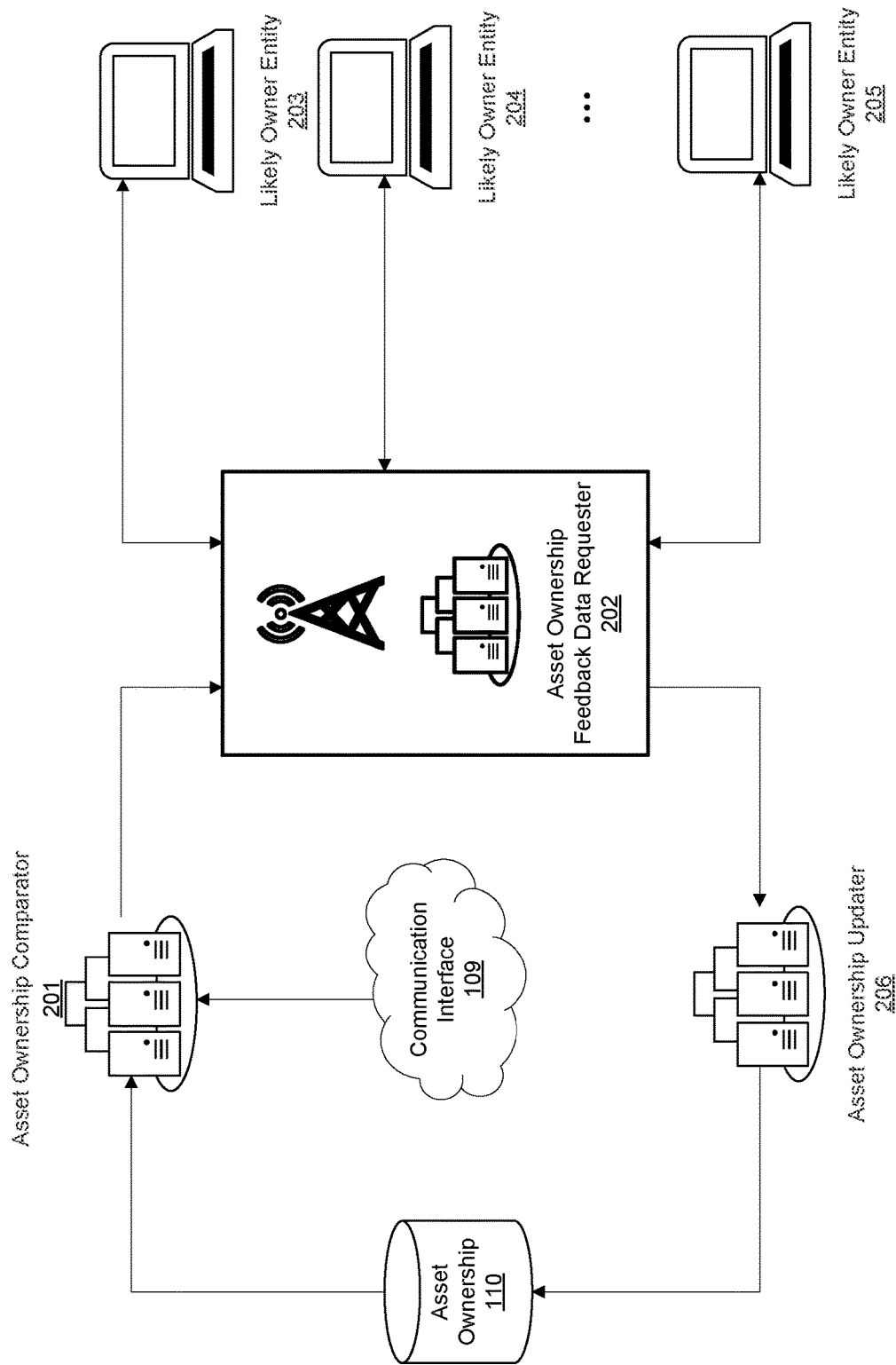
FIG. 2 is a block diagram illustrating components of the updating asset ownership system for processing data associated with asset entities.

FIG. 2 is a block diagram illustrating components of the updating asset ownership system for processing data associated with asset entities. Asset ownership data store 110 is configured to store asset owner data associated with asset entities. For example, asset ownership data store 110 can store asset owner data associated with asset entities 101, 102, 103, and 104. Each asset owner data record stored in the asset ownership data store can identify as a designated owner at least a first owner entity associated with at least one asset entity. In other words, each asset owner data record can designate one owner for one asset entity, multiple owners for one asset entity, one owner for multiple asset entities, or multiple owners for multiple asset entities. For example, the asset ownership data store 110 can store an asset owner data record that designates an owner entity Joe for asset entity 101, store an asset owner data record that designates asset owner entities Alice and Bill for asset entity 102, and store an asset owner data record that designates asset owner entity Bob for asset entity 103 and 104.

In some embodiments, some of the designated owners stored in the asset ownership data store can identify the true owner(s) of the associated at least one asset entity with a likelihood value (probability) of 1. This can be because dealership entities, customer entities, or service entities have kept the asset owner data of the asset ownership data store updated, and the designated owner is verified as identifying the true owner(s) of the corresponding at least one asset entity. The likelihood value represents the probability that the first owner entity identified as the designated owner is the true owner of the associated at least one asset entity. Other designated owners stored in the asset ownership data store are not the true owner(s) of the associated at least one asset entity, but a most likely owner with likelihood value (probability) between 0 and 1 of being the true owner(s) of the at least one asset entity. This can be because dealership entities, customer entities, or service entities have missing ownership information data or lost track of the ownership of the asset entity, hence the asset owner data of the asset ownership data store is not updated and verified. In other words, the asset ownership data store contains asset owner data that designates true owners and also asset owner data that is uncertain and requires further determination of how likely the designated owner identifies the true owner(s).

In some embodiments, the asset owner data of the asset ownership data store 110 is configured to be updated periodically at a predefined periodicity (e.g., yearly, monthly, every set number of years, weekly, daily, hourly, every minute, etc.). The choice of predefined periodicity can be based on how frequently change of ownership may occur for an asset entity. For example, asset owner data associated with asset entities that tend to get bought and sold often may be updated with a new designated owner more frequently, while asset owner data associated with asset entities that tend to be held on for a long time may be updated with a new designated owner less frequently. In other embodiments, the asset owner data of the asset ownership data store 110 is updated whenever communication interface 109 receives telemetry data or asset information data. For example, when communication interface 109 receives new telemetry data or asset information data, the updating asset ownership system can be triggered to update the asset owner data of asset ownership data store 110. The update can come from asset ownership comparator 201 or asset ownership updater 206, which are both described subsequently.

Asset ownership comparator 201 of the updating asset ownership system is configured to update an asset owner data record, specifically the designated owner of at least one asset entity, by processing the telemetry data and/or asset information data associated with the at least one asset entity (hereinafter "the at least one asset entity being updated"). The telemetry data and/or asset information data can be received by communication interface 109 and/or stored in the asset ownership data store 110. Asset ownership comparator 201 can process the telemetry data or asset information data associated with the at least one asset entity being updated using an ensemble of models 300 described in FIG. 3 (e.g., one or more asset entities that have their telemetry data or asset information data processed by ensemble of models 300). In some embodiments, ensemble of models 300 are one or more machine learning models (e.g., deep neural networks, decision trees, random forest, gradient boosting, logistic regression, linear regression, ensemble methods, support-vector machine, genetic algorithm, evolutionary programming, etc.) that calculate a set of ownership likelihood values associated with a plurality of likely owner entities. The ownership likelihood value represents the probability that a likely owner entity is the true owner of the associated at least one asset entity being updated. In other embodiments, ensemble of models 300 are one or more probability models based on Bayesian statistics (e.g., Naïve Bayes, Bayesian networks, Bayes theorem) that calculate the conditional probabilities that the associated at least one asset entity being updated is owned by a plurality of likely owner entities. The way the probability is calculated is described subsequently. Ensemble of models 300 can be trained on historical data of asset entities, including telemetry data and/or asset information data, labeled with ground-truth owner entities.

In some embodiments, ensemble of models 300 can input a set of features generated from the telemetry data or asset information data associated with the at least one asset entity being updated. These features can be known as telemetry features and asset information features respectively. In some embodiments, the features are embedded in feature vectors. In other embodiments, the features are categorical variables used as feature inputs to a decision tree or similar, or categories the probability models are conditioned on. The types of telemetry data (e.g., oil levels, performance, location information) or type of asset information data (e.g., sales information, rental history) used depends on the features generated, and a different set of telemetry features or asset information features can be input into a different machine learning model. Examples of telemetry features or asset information features can include, but are not limited to, embeddings for the asset type/model, asset type lifecycle (e.g., all the owners the asset has been sold to and used by, the asset's age, service meter units etc.), asset geographic location (e.g., geographic coordinates, address, relative proximity to other assets, etc.), asset proximity to other asset entities (e.g., magnitude of distance, radial distance, etc.), asset usage (e.g., oil level value, performance metrics, battery level values, units of time of use, engine measurements, temperature values, operation warning error indicator variables, fault codes, service information, asset inspection information, work order history, invoice for work done, etc.), asset activities (e.g., bulldozing, shoveling, dumping, storing, mixing, transporting; degree of activity), fleet data (e.g., fleet asset numbers, fleet asset values, fleet asset ages, fleet asset usage values), asset acquisitions by a party (e.g., all assets owned by a likely owner according to buyer history and information, sales history and information, rent history and information, lease history and information, dealership history and information, auction history and information), or industries a party is involved in (e.g., construction, infrastructure, landscaping, etc. —extracted from customer information). These features and how they can be used are discussed more in detail in FIG. 3.

Ensemble of models 300 can determine likely owner entities of the at least one asset entity being updated and calculate ownership likelihood values associated with the likely owner entities. Then, for each of the likely owner entities, the asset ownership comparator can combine the ownership likelihood values outputted from the one or more models in the ensemble using an aggregation function (e.g., computing the product, sum, mean, median, weighted mean, weighted sum, weighted product, etc.). For example, a model 1 can determine likely owner 203 and likely owner 204 of the asset entity 101 being updated, each with associated ownership likelihood values of 0.2 and 0.6. Another model 2, in this example, can determine that likely owner 203 is the only likely owner of the asset entity 101 being updated with an associated ownership likelihood value of 0.9. The ownership likelihood values 0.2 and 0.9 for likely owner entity 203 can be averaged to output 0.55, while 0.6 is output for likely owner entity 204. Each ownership likelihood value represents the probability that the associated owner entity is the designated owner of the at least one asset entity being updated. More details on different models using different features are described in FIG. 3.

Based on the processing of the received telemetry data or asset information data, asset ownership comparator 201 can identify a second owner entity (as compared to the first owner entity described in ¶0017 of FIG. 1) that is associated with the at least one asset entity being updated. The second owner entity can be the most likely owner entity, which has the highest ownership likelihood value of the outputted likely owner entities and associated ownership likelihoods from ensemble of models 300. The most likely owner entity can be determined by ranking the likely owner entities based on their associated ownership likelihood values outputted from ensemble of models 300 and selecting the likely owner entity with the highest ownership likelihood value. The second owner entity can thus be the "most likely" owner entity of the associated at least one asset entity being updated. Asset ownership comparator 201 then evaluates whether the second owner entity is more likely than the first owner entity (the one currently identified as the designated owner of the at least one asset entity being updates, described in ¶0017 of FIG. 1) to be the designated owner of the at least one asset entity being updated. When the second owner is more likely than the first owner entity to be the designated owner, asset ownership comparator 201 assigns the second owner entity to be the designated owner of at least one asset entity being updated. Asset ownership comparator 201 can assign the second owner entity by updating/modifying the asset owner data record identifying the first asset entity in the asset ownership data store 110 to be the second owner entity.

Asset ownership feedback data requester 202 of the updating asset ownership system is configured to transmit a query about ownership to the likely owner entities determined by ensemble of models 300 from the asset ownership comparator 201. Asset ownership feedback data requester 202 can transmit the query about ownership to the likely owner entities 203, 204, 205, and so on (additional likely owner entities determined by ensemble of models 300). Likely owner entities 203, 204, and 205 can be computing devices configured to receive the query about ownership from the asset ownership feedback data requester. The communication between the asset ownership feedback data requester 202 and the likely owner entities 203, 204, and 205 can occur wirelessly, wired, over a cloud, or any communication network. Asset ownership feedback data requester 202 can transmit the queries about ownership in parallel or sequentially, and the likely owner entities 203, 204, and 205 can receive the queries about ownership in parallel or sequentially. The query about ownership can include a request for ownership feedback data from the likely owner entity regarding whether they are the owner of the at least one asset entity being updated. The likely owner entity can provide an indication (e.g., "yes", "no", "maybe", or "decline to answer") if they are the owner of the at least one asset entity being updated. In some embodiments, the likely owner entities 203, 204, and 205 each include a graphical user interface for providing ownership feedback data. For example, the request for ownership feedback data can be presented as a survey, questionnaire, form, entries to be filled/submitted, etc. In some embodiments, the ownership feedback data also allows the likely owner entity to provide asset information data regarding any asset entity the likely owner entity is in procession of or has interacted with.

Likely owner entities 203, 204, and 205 can provide and subsequently transmit ownership feedback data. Asset ownership feedback data requester 202 can then receive the ownership feedback data from one or more of the likely owner entities. This communication between the asset ownership feedback data requester 202 and the likely owner entities 203, 204, and 205 can also occur wirelessly, wired, over a cloud, or any communication network. Likely owner entities 203, 204, and 205 can transmit the ownership feedback data in parallel or sequentially and asset ownership feedback data requester 202 can receive the ownership feedback data in parallel or sequentially.

Asset ownership updater 206 of the updating asset entity system is configured to further update an asset owner data record, specifically the designated owner of the asset entity being updated, by processing the one or more ownership feedback data received by asset ownership requester 202. Asset ownership updater 206 can process the one or more ownership feedback data received by using the same ensemble of models 300 or different ensemble of models 300 used by the asset ownership comparator 201. In some embodiments, ensemble of models 300 are one or more machine learning models (e.g., deep neural networks, decision trees, random forest, gradient boosting, logistic regression, linear regression, ensemble methods, support-vector machine, genetic algorithm, evolutionary programming, etc.) that calculate a set of ownership likelihood values associated with a plurality of likely owner entities. The ownership likelihood value represents the probability that a likely owner entity is the true owner of the associated at least one asset entity being updated. In other embodiments, ensemble of models 300 are one or more probability models based on Bayesian statistics (e.g., Naïve Bayes, Bayesian networks, Bayes theorem) that calculate the conditional probabilities that the associated at least one asset entity being updated is owned by a plurality of likely owner entities. Ensemble of models 300 can be retrained or fine-tuned to incorporate ownership feedback data along with historical data of asset entities, including telemetry data and asset ownership data, labeled with ground-truth owner entities.

In some embodiments, ensemble of models 300 can input a set of features generated from telemetry data or asset information data—similar to the one generated in asset ownership comparator 201 (described in ¶0022), and also features generated from the ownership feedback data associated with the at least one asset entity being updated. These features can be known as telemetry features, asset information features (described in ¶0022), and ownership feedback data features respectively. The ownership feedback data features can be indicator variables (e.g., 0 or 1) representing whether or not the likely owner entity indicated they are the owner of the at least one asset entity being updated, an embedding that represents whether "yes", "no", "maybe", or "decline to answer" is provided in the ownership feedback data, or any feature vector representation of the ownership feedback data provided. In some embodiments, the ownership feedback data features further embed how accurate an ownership feedback data is. For example, feedback transmitted by a likely owner entity on a Friday after 7 pm is less likely to be accurate than feedback transmitted on a Wednesday at 11 am. As another example, statistics may show that likely owner entity 203 submits ownership feedback data that is 100% accurate, while likely owner entity 204 submits ownership feedback data that erroneously claims ownership of the at least one asset being updated 5% of the time. This "accuracy" feature can be embedded by representing less accurate ownership feedback data with higher weight values, and more accurate ownership feedback data with lower weight values.

Ensemble of models 300 can determine likely owner entities of the at least one asset entity being updated and calculate ownership likelihood values associated with the likely owner entities. Then, for each of the likely owner entities, the asset ownership comparator can combine the ownership likelihood values outputted from the one or more models in the ensemble using an aggregation function (e.g., computing the product, sum, mean, median, weighted mean, weighted sum, weighted product, etc.). Each ownership likelihood value represents the probability that the associated owner entity is the designated owner of the at least one asset entity being updated, after incorporating the ownership feedback data.

Based on processing of the received ownership feedback data, asset ownership updater 206 can identify a most likely owner entity that is associated with the at least one asset entity being updated. In some embodiments, the most likely owner entity can be associated with more than one asset entity (e.g., associated with multiple asset entities that have their telemetry data, asset information data, or ownership feedback data processed by ensemble of models 300). The most likely owner entity, as the name suggests, has the highest ownership likelihood value of the outputted likely owner entities and associated ownership likelihoods from ensemble of models 300. The most likely owner entity can be determined by ranking the likely owner entities based on their associated ownership likelihood values outputted from ensemble of models 300 and selecting the likely owner entity with the highest ownership likelihood value. Asset ownership updater 206 can assign the most likely owner entity to be the designated owner of at least one asset entity being updated. Asset ownership updater 206 can assign the most likely owner entity by updating/modifying the designated owner of the corresponding asset owner data in the asset ownership data store 110 to be the most likely owner.

Figure 3:
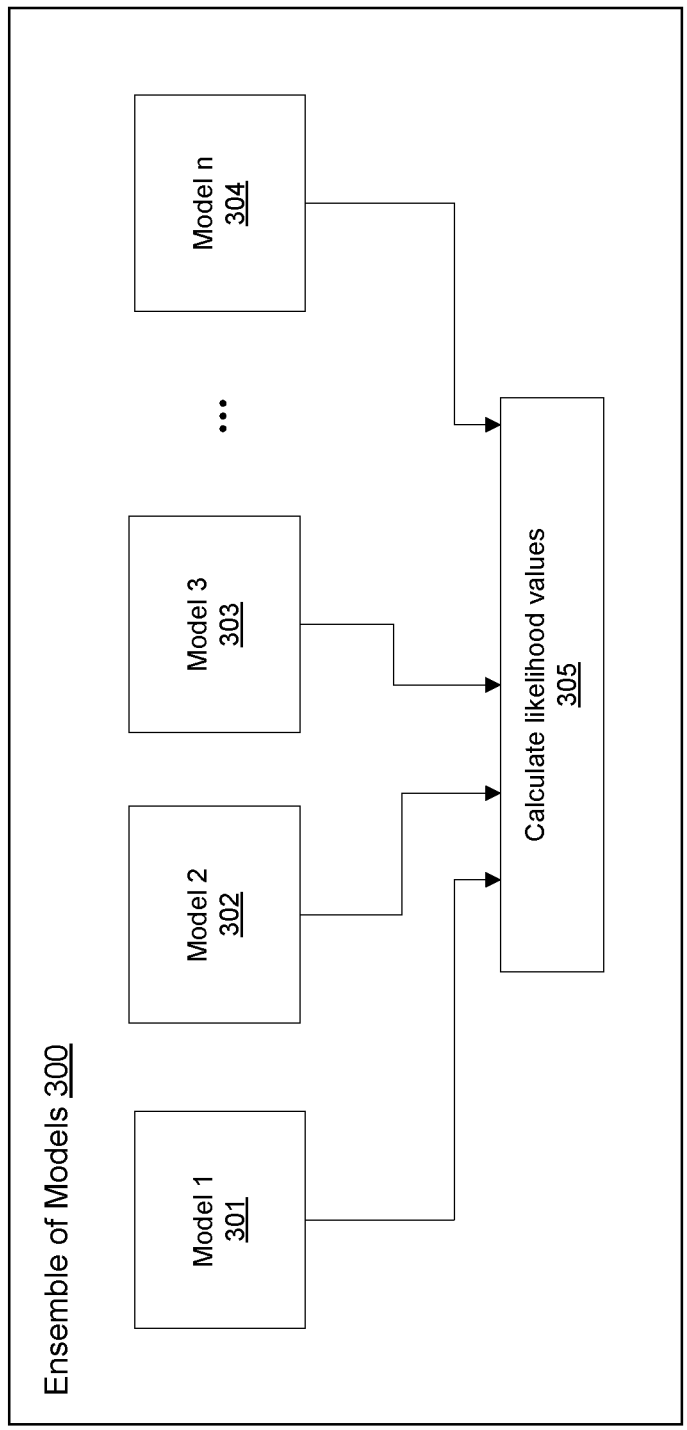
FIG. 3 is a block diagram illustrating the ensemble of models used as part of the asset ownership comparator and the asset ownership updater.

FIG. 3 is a block diagram illustrating the ensemble of models used as part of the asset ownership comparator and the asset ownership updater. In some embodiments, ensemble of models 300 are one or more machine learning models (e.g., deep neural networks, decision trees, random forest, gradient boosting, logistic regression, linear regression, ensemble methods, support-vector machine, genetic algorithm, evolutionary programming, etc.) that calculate a set of ownership likelihood values associated with a plurality of likely owner entities. The ownership likelihood value represents the probability that a likely owner entity is the true owner of the associated at least one asset entity being updated. In other embodiments, ensemble of models 300 are one or more probability models based on Bayesian statistics (e.g., Naïve Bayes, Bayesian networks, Bayes theorem) that calculate the conditional probabilities that the associated at least one asset entity being updated is owned by a plurality of likely owner entities. The way the probability is calculated is described subsequently. Ensemble of models 300 can be trained on historical data of asset entities (including telemetry data, asset information data, and ownership feedback data) labeled with ground-truth owner entities. Blocks 301, 302, 303, and 304 can be the one or more machine learning models or probability models: model 1, model 2, model 3, . . . , and model n respectively. In other words, the ensemble of models can contain up to n models, where n is any number greater than 0. Then, for each of the likely owner entities, calculate likelihood values 305 combines the ownership likelihood values outputted from the one or more models in the ensemble using an aggregation function (e.g., computing the product, sum, mean, median, weighted mean, weighted sum, weighted product, etc.). In other words, the ownership likelihood values outputted for a likely owner entity by the one or more models are aggregated. That aggregation is performed for each of the one or more likely owner entities determined by the one or more models. The output is a set of ownership likelihood values associated with a plurality of likely owner entities. Each ownership likelihood value represents the probability that the associated owner entity is the designated owner of the at least one asset entity being updated.

In some embodiments, one of the models in the ensemble of models 300 is an asset usage model. The asset usage model can input features related to the usage and activity of the at least one asset entity being updated. These features can include, but are not limited to, performance metrics, oil levels, battery levels, temperature, humidity levels, time of use, proximity data, service meter units, vehicle metrics, engine metrics, fault codes, service information, asset inspection information, work order measurements, normative behavior indications, operation warning errors, and/or changes and fluctuations in the aforementioned features (e.g., temperature changes, battery levels). Additional features regarding the asset's activity can include indications of whether the asset is bulldozing, shoveling, dumping, storing, mixing, transporting, etc. These features can be embedded in a feature vector or be used as categorical variables. The asset lifecycle model can determine what activity (e.g., construction industry, industrial work, home building, etc.), the degree of activity (e.g., intensity of task), the environment of an activity (e.g., climate, temperature, humidity), and service/maintenance operations (e.g., maintenance patterns) an asset entity is involved in and match the asset entity to likely owner entities that have assets with similar usage history and activity involvement. The asset lifecycle model can also determine the patterns of changes/fluctuations in usages of the asset, along with the frequency of said changes (e.g., monthly, annually, daily, hourly, by the minute, every number of years, etc.) and match it to likely owner entities that have assets with similar usage changes. In other words, the asset lifecycle model can learn, based on the asset usage and activity, the likely owner entities of the asset and calculate associated ownership likelihood values. For example, the asset lifecycle model can learn to determine that asset entity 104 undergoes a similar usage as assets owned by likely owner entity 204, including oil level changes monthly, high temperature climate, fast moving vehicle, engine throttling, and frequent services/repairs. The asset usage model can be trained on historical data of asset entities, including telemetry data and/or asset information data related to the asset entity's usage and activities, labeled with ground-truth owner entities.

In some embodiments, one of models in the ensemble of models 300 is an asset lifecycle model. The asset lifecycle model can input features related to the lifecycle of the at least one asset entity being updated. These features can include, but are not limited to, all the owners the asset has been sold to and used by, is the asset ever likely to be sold by a certain owner the asset's age, and/or service meter units. They can be generated from asset information data including, but not limited to, asset model/type information, asset age, and/or usage information. These features can be embedded in a feature vector or be used as categorical variables. The asset lifecycle model can learn, based on the asset's lifecycle, the likely owner entities of the asset and calculate associated ownership likelihood values. For example, the asset lifecycle model can learn that an asset more likely to be sold by an owner entity means that the owner entity is less likely to be the owner and has a lower associated ownership likelihood value. The asset lifecycle model can be trained on historical data of asset entities, including telemetry data and/or asset information data related to the asset entity's lifecycle, labeled with ground-truth owner entities.

In some embodiments, one of the models in the ensemble of models 300 is a party fleet model. The party fleet model can input features related to the fleet information (a type of asset information data) of the at least one asset entity being updated. These features can include, but are not limited to, the fleet asset number(s), fleet asset value(s) (e.g., price), fleet asset age(s), fleet asset usage value(s) (e.g., service meter units, mileage, etc.), and/or industries of possible likely owners. These features can be embedded in a feature vector or be used as categorical variables. The party fleet model can learn, based on the asset's fleet information, the likely owner entities and calculate associated ownership likelihood values. For example, the party fleet model can determine likely owner entity 203 and 204 to be the likely owners and learn that the at least one asset being updated shares more similar fleet information with fleets owned by likely owner entity 203, while sharing less similar fleet information with fleets owned by likely owner entity 205. Thus, likely owner entity 205 can receive a lower ownership likelihood value, while likely owner entity 203 can receive a higher ownership likelihood value. The party fleet model can be trained on historical data of asset entities, including telemetry data and/or asset information data related to the asset entity's fleet information, labeled with ground-truth owner entities.

In some embodiments, one of the models in the ensemble of models 300 is a party purchase model. The party purchase model can input features related to the purchase recency of the at least one asset entity being updated. These features can include, but are not limited to, how recent buyers, sellers, leasers, renters, auctioneers, and/or dealers that have been involved in the acquisition of the at least one asset entity being updated. They can be generated from types of asset information data including, but not limited to, buyer history and information, sales history and information, rent history and information, lease history and information, dealership history and information, auction history and information, service history and information, and/or manually entered ownership information. These features can be embedded in a feature vector or be used as categorical variables. The party purchase model can learn, based on the asset's purchase recency, the likely owner entities of the nearby asset entities and calculate associated ownership likelihood values. For example, the party purchase model can determine that likely owner entities 203, 204, and 205 have all acquired the at least one asset entity being updated recently, and then further calculate the associated ownership likelihood values depending on how recent the acquisitions were (e.g., more recent can mean greater likelihood of ownership, while less recent can mean less likelihood of ownership). The party fleet model can be trained on historical data of asset entities, including telemetry data and/or asset information data related to the asset entity's purchase recency, labeled with ground-truth owner entities.

In some embodiments, one of the models in the ensemble of models 300 is an ownership geographies model. The ownership geographies model first identifies nearby asset entities in proximity to the at least one asset entity being updated using location data. The ownership geographies model can then input features related to the geographic location of the at least one asset entity being updated. These features can include, but are not limited to, the asset's geographic coordinates, address, and/or relative proximity to other asset entities. They can be generated from types of telemetry data including, but not limited to, asset geographic location and/or asset proximity to other asset entities. These features can be embedded in a feature vector or be used as categorical variables. The party fleet model can learn, based on the asset's fleet information, the likely owner entities of the nearby asset entities and calculate associated ownership likelihood values. For example, the ownership geographies model can first identify that asset entity 101 and asset entity 103 are near asset entity 102 using location data. The ownership geographies model then learns that likely owner 203 is likely to own asset entity 101 and likely owner 204 is likely to own asset entity 103, thus they are both likely to own asset entity 102. The ownership geographies model can be trained on historical data of asset entities, including telemetry data and/or asset information data related to the asset entity's location data/information, labeled with ground-truth owner entities.

In some embodiments, one of the models in the ensemble of models 300 is an ownership path model. The party purchase model can input features related to the ownership path of the at least one asset entity being updated. These features can include, but are not limited to, which parties sell, rent, lease, or auction to which parties. They can be generated from types of asset information data including, but not limited to, buyer history and information, sales history and information, rent history and information, lease history and information, dealership history and information, auction history and information, service history and information, and/or manually entered ownership information. These features can be embedded in a feature vector or be used as categorical variables. The party purchase model can learn, based on the asset's ownership path, the likely owner entities and calculate associated ownership likelihood values. For example, the party purchase model can determine that asset entity 101 was first sold to likely owner entity 203, who then sold it to likely owner entity 204, who then sold it to 205. Based on this determination, the party purchase model can further calculate the associated ownership likelihood values based on when in the chain of acquisition, the likely owner entity lies (e.g., a likely owner entity more at the beginning of the path can have a greater ownership likelihood, while a likely owner entity more at the end can have a lesser ownership likelihood). The party fleet model can be trained on historical data of asset entities, including telemetry data and/or asset information data related to the asset entity's ownership path, labeled with ground-truth owner entities.

Figure 4:
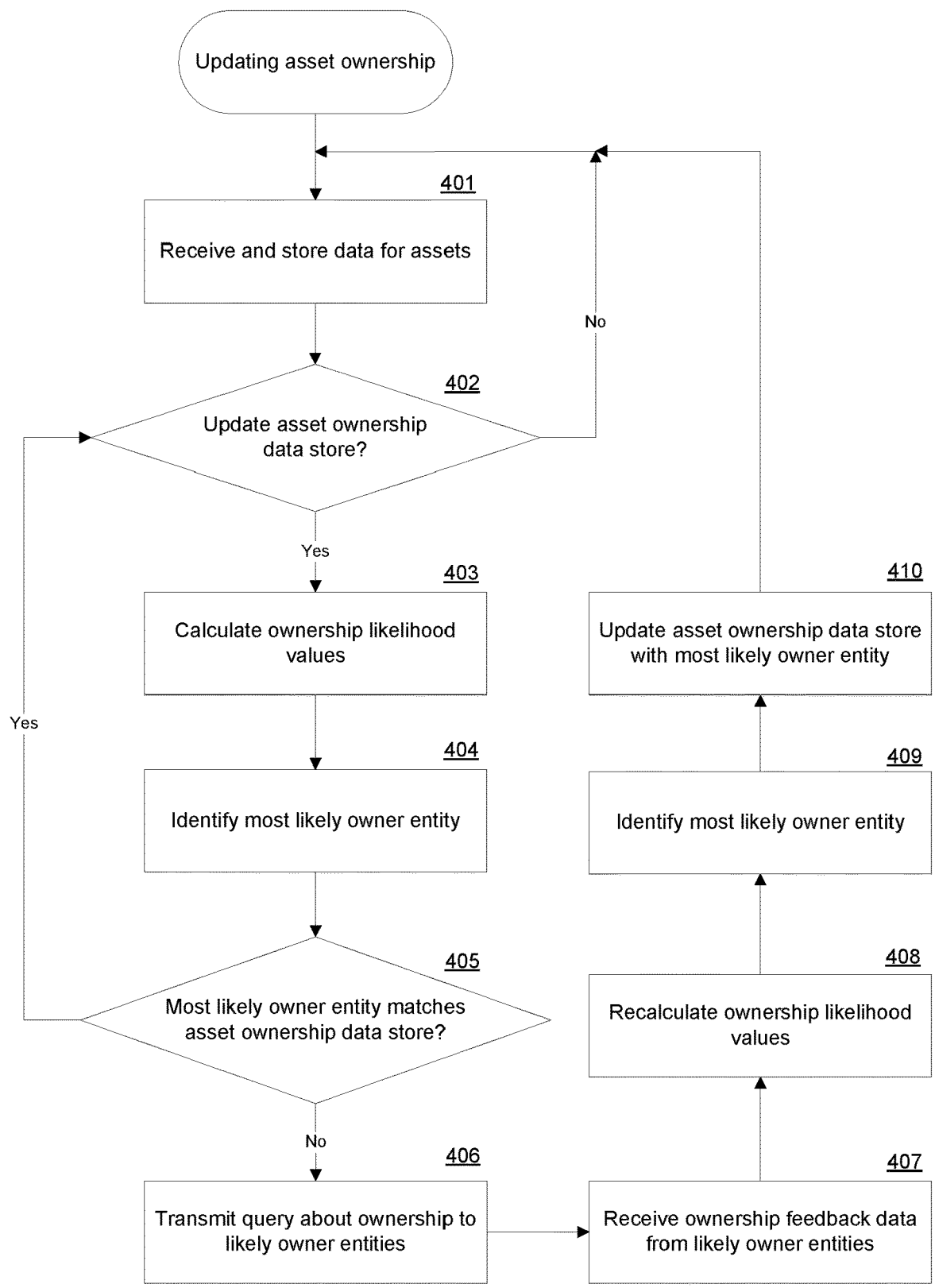
FIG. 4 is a flow diagram illustrating a process for updating asset ownership.

FIG. 4 is a flow diagram illustrating a process for updating asset ownership. At step 401, the updating asset ownership process receives data, including telemetry data, from asset entities and stores the data associated with the asset entities. Each asset owner data record identifies as a designated owner at least a first owner entity that is associated with at least one of the asset entities. The asset entities can be any telematics-enabled machinery, vehicle, equipment, or device. In some implementations, the updating asset ownership process also receives and stores asset information data from dealership entities, customer entities, and/or service entities. At step 402, the updating asset ownership process determines whether to update at least one asset entity in the asset ownership data store 110. In some implementations, the asset ownership process updates the asset ownership data store periodically at a predefined periodicity—so for every period, the asset ownership data store is updated. When the asset ownership data store determines it can update asset ownership data store 110, the updating asset ownership process proceeds to step 403. When the asset ownership data store determines to not update asset ownership data store 110, the updating asset ownership process waits to receive data for asset entities again.

The updating asset ownership process then processes the telemetry data and/or asset information data associated with at least one asset entity. The updating asset ownership process processes the telemetry data and/or asset information data by inputting features generated from the telemetry data and/or asset information data to ensemble of models 300. Ensemble of models 300 can be one or more machine learning models or probability models, both described in detail in FIG. 2 and FIG. 3. Using ensemble of models 300, the updating asset ownership process calculates ownership likelihood values associated with likely owner entities at step 403. At step 404, based on the processing, the updating asset ownership process identifies a second owner entity, which can be the most likely owner entity, associated with the at least one asset entity being updated. The most likely owner entity has the highest ownership likelihood value of the outputted likely owner entities and associated ownership likelihoods from ensemble of models 300.

At step 405, the updating asset ownership process determines whether the second owner entity (which can be the most likely owner entity) matches the designated owner of the at least one asset entity being updated in asset ownership data store 110. The updating asset ownership process determines this by evaluating whether the second owner entity, which can be the most likely owner entity, is more likely than the first owner entity to be the designated owner of the at least one asset entity being updated. When the second owner entity (which can be the most likely owner entity) is more likely than the first owner entity to be the designated owner, the updating asset ownership process assigns the second owner entity to be the designated owner of the at least one asset entity being updated. When the most likely owner entity (or second owner entity) matches the designated owner of the at least one asset entity being updated in asset ownership data store 110, the updating asset ownership process proceeds to step 406. When the most likely owner entity (or second owner entity) does not match the designated owner of the at least one asset entity being updated in asset ownership data store 110, the updating asset ownership process proceeds back to step 402.

At step 406, the updating asset ownership process transmits a query about ownership to the likely owner entities. The likely owner entities can receive the query about ownership, choose to provide ownership feedback data, and transmit the ownership feedback data. At step 407, the updating asset ownership process can receive one or more ownership feedback data from the likely owner entities.

The updating asset ownership process then processes the ownership feedback data received. The updating asset ownership process processes the ownership feedback data by inputting features generated from the ownership feedback data, the telemetry data and/or asset information data to an ensemble of models. The ensemble of models can be the same ensemble of models 300 described at steps 403 and 404, except retrained or fine-tuned with ownership feedback data as additional inputs/features. Using the ensemble of models, the updating asset ownership process recalculates ownership likelihood values associated with likely owner entities at step 408. At step 409, based on the processing, the updating asset ownership process identifies a most likely owner entity associated with the at least one asset entity being updated.

At step 410, the updating asset ownership process updates the asset ownership data store with the most likely owner entity. The updating asset ownership process performs the update by assigning the second owner entity to be the designated owner of the at least one asset entity being updated. Once the process is complete, the updating asset ownership process can wait to receive data for asset entities again.

Figure 5:
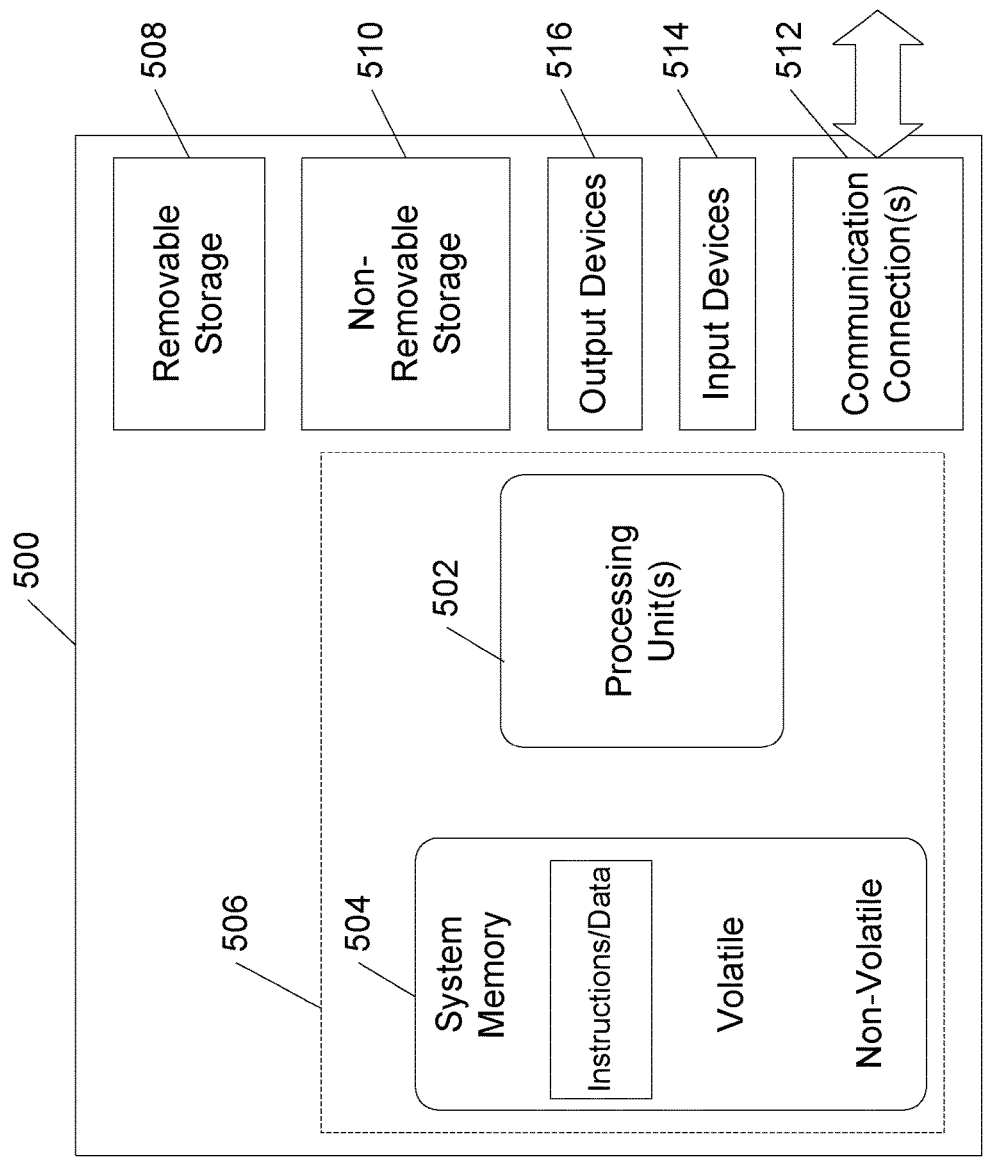
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

INDUSTRIAL APPLICABILITY

The updating asset ownership system is a closed loop (crowd sourcing) automated system that can evaluate data received from asset entities, identify potentially problematic asset ownership information, collect customer feedback on their ownership of the most suspect assets, and utilize the customer feedback to re-evaluate and correct the asset ownership information in the platform. The assets can typically be telematics-enabled machinery used in industrial settings. Due to the ease at which telematics-enabled machinery can get transferred between different owners and how easy asset ownership information can change or get lost, the updating asset ownership system is able to update the asset ownership information of the telematics-machinery using a single system in a reliable, robust, and secure manner. The main components of the updating asset ownership system include asset entities, dealership entities, service entities, customer entities, a communication interface, an asset ownership data store, an asset ownership comparator, an asset ownership feedback data requester, likely owner entities, and an asset ownership updater.

The asset entities comprise the telematics-enabled machinery and can transmit telemetry data. By collecting telemetry data, the updating asset ownership system can exploit data related to the asset entities themselves to identify problematic asset ownership information and determine whether updates are needed. The communication interface can receive the telemetry data from the asset entities and further transfer the data to other components of the updating asset ownership system. Dealership entities, service entities, and customer entities can also transmit asset information data, which can be any data related to the asset's ownership and lifecycle, to the communication interface. By combining both telemetry data and asset information data, the updating asset ownership system can make use of both direct and indirect factors related to the asset entity that can influence its ownership. Asset ownership information can be stored in an asset ownership data store, which is configured to store asset owner data that identify designated owners of asset entities.

The asset ownership comparator can update the asset ownership data store by processing the telemetry data and/or asset information data. Based on the processing, the asset ownership comparator can identify whether more likely designated owners of certain asset entities exist and update the asset owner data with the more likely designated owners.

In some embodiments, the asset ownership comparator uses an ensemble of models to process the telemetry data and/or asset information data. After updating the asset owner data, the asset ownership feedback data requester can verify how robust and reliable the update performed by the asset ownership comparator is by requesting for feedback from likely owner entities determined by the ensemble of models. The asset ownership feedback data requester can transmit a query about ownership to likely owner entities and can receive ownership feedback data from the likely owner entities. The asset ownership updater can process the received ownership feedback data, and further identify if there are even better designated owners of certain asset entities and further update the asset owner data store. These components that comprise the closed loop process described enable the updating asset ownership system to make accurate identifications of problematic asset ownership information, and perform robust, reliable, and verified updates to asset ownership.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system for automatically updating asset ownership for telematics-enabled work machinery, the system comprising:
 a plurality of work machine asset entities comprising the telematics-enabled work machinery, wherein each work machine asset entity transmits a plurality of telemetry data records;
 a communication interface that receives one or more of the plurality of telemetry data records from at least one of the plurality of work machine asset entities;
 an asset ownership data store configured to store one or more asset owner data records associated with the at least one of the plurality of work machine asset entities, wherein the asset owner data record identifies as a designated owner at least a first owner entity that is associated with the at least one of the plurality of work machine asset entities; and
 an asset ownership comparator having circuitry that:
  identifies, using a plurality of different trained machine learning likelihood models, a first plurality of likely owner entities associated with the at least one of the plurality of work machine asset entities;
  receives inconsistent ownership feedback data in terms of ownership of one or more of the at least one of the plurality of work machine asset entities;
  retrains the plurality of different trained machine learning likelihood models based on the received inconsistent ownership feedback data;
  determines, using the plurality of different retrained machine learning likelihood models, a second plurality of likely owner entities associated with one or more work machine asset entities;
  based on the determination, automatically identifies, using an aggregator of the asset ownership comparator that receives outputs of the plurality of different retrained machine learning likelihood models having processed the inconsistent ownership feedback data, from among the second plurality of likely owner entities, a most likely owner of the at least one of the plurality of work machine asset entities, the most likely owner being different from the first owner;

replaces in the asset ownership data store the first owner as the designated owner with the most likely owner as the designated owner; and outputs for display on a display device, an indication that the most likely owner is the designated owner of the at least one of the plurality of work machine asset entities.

2. The system of claim 1, wherein the plurality of telemetry data records comprises one or more of: location information, sensory data, asset condition, performance data, oil levels, battery levels, temperature, time of use, proximity data, service meter units, vehicle data, engine data, operation warning errors, normative behavior, or fault codes.

3. The system of claim 1, wherein the asset owner data records of the asset ownership data store are updated at a predefined periodicity.

4. The system of claim 1, wherein the plurality of different trained machine learning likelihood models comprise at least one of: asset lifecycle model, party fleet model, party purchase model, ownership geographies model, ownership path model, or asset usage model.

5. A computer-implemented method for automatically updating asset ownership comprising:

receiving, using circuitry, one or more of a plurality of telemetry data records from at least one of a plurality of work machine asset entities;

storing, using the circuitry, one or more asset owner data records associated with the at least one of the plurality of work machine asset entities, wherein the asset owner data record identifies as a designated owner at least a first owner entity that is associated with the at least one of the plurality of work machine asset entities;

processing, using the circuitry and a plurality of different trained machine learning likelihood models, one or more of the received telemetry data records;

based on the processing, identifying, using the circuitry and the plurality of different trained machine learning likelihood models, a first plurality of likely owner entities associated with the at least one of the plurality of work machine asset entities;

responsive to queries about ownership to the first plurality of likely owner entities, electronically receiving, using the circuitry, ownership feedback data from at least one of the first plurality of likely owner entities, the electronically received ownership feedback data being inconsistent in terms of ownership of one or more of the at least one of the plurality of work machine asset entities;

retraining, using the circuitry, the plurality of different trained machine learning likelihood models based on the received ownership feedback data;

determining, using the circuitry and the plurality of different retrained machine learning likelihood models, a second plurality of likely owner entities associated with one or more work machine asset entities associated with the inconsistent ownership feedback data;

based on said determining, automatically identifying, using an aggregator receiving outputs of the plurality of different retrained machine learning likelihood models having processed the inconsistent ownership feedback data, from among the second plurality of likely owner entities, a most likely owner of the at least one of the plurality of work machine asset entities, the most likely owner being different from the first owner;

automatically electronically assigning the most likely owner as the designated owner of the at least one of the plurality of work machine asset entities;

electronically replacing in computer-readable memory the first owner as the designated owner with the most likely owner as the designated owner; and electronically outputting for display on a display device, an indication that the most likely owner is the designated owner of the at least one of the plurality of work machine asset entities.

6. The method of claim 5, further comprising storing a plurality of asset information data records, wherein the plurality of asset information data records comprises one or more of: asset model/type information, asset age, dealership history and information, sales history and information, auction history and information, usage information, contact information, rent history and information, lease history and information, buyer history and information, customer information, service history and information, manually entered ownership information, asset inspection information, inventory information, miscellaneous information, work order history, fleet information, or invoices for work done.

7. The method of claim 5, wherein the plurality of work machine asset entities comprises one or more of: machines, vehicles, equipment, or devices.

8. The method of claim 5, wherein the method further comprises:

identifying a set of nearby asset entities in proximity to the at least one of the plurality of work machine asset entities using the circuitry and GPS data from GPS sensors of each of the nearby asset entities;

determining, using the circuitry, a plurality of likely owner entities that each own at least one of the set of nearby asset entities;

wherein said determining the plurality of likely owner entities that each own at least one of the set of nearby asset entities includes:

generating one or more features from one or more of the telemetry data records, wherein the one or more features comprise the set of nearby asset entities;

inputting the generated one or more features to the plurality of different trained machine learning likelihood models; and using the plurality of different trained machine learning likelihood models, calculating a plurality of ownership likelihood values associated with a plurality of likely owner entities that each own at least one of the set of nearby asset entities;

wherein the most likely owner has a highest ownership likelihood value of the plurality of likely owner entities.

9. The method of claim 8, wherein the plurality of different trained machine learning likelihood models comprises an ownership geographies model and at least one of: an asset lifecycle model, a party fleet model, a party purchase model, an ownership path model, or an asset usage model.

10. The method of claim 8, wherein the proximity is a predefined threshold distance.

* * * * *